May 26, 1970     F. S. OWENS     3,514,427
WIDE TEMPERATURE RANGE MULTIPHASE VISCOELASTIC
DAMPING COMPOSITIONS
Filed June 26, 1967
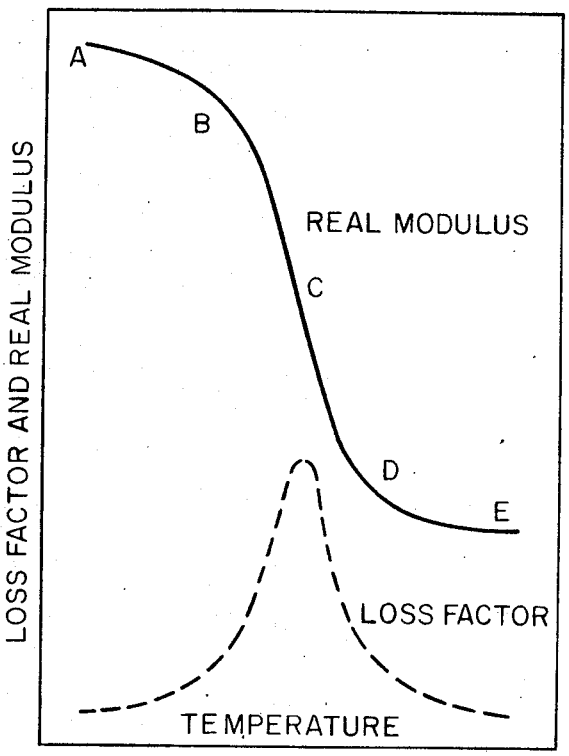
TYPICAL LOSS FACTOR AND REAL MODULUS VS. TEMPERATURE
FIG. I
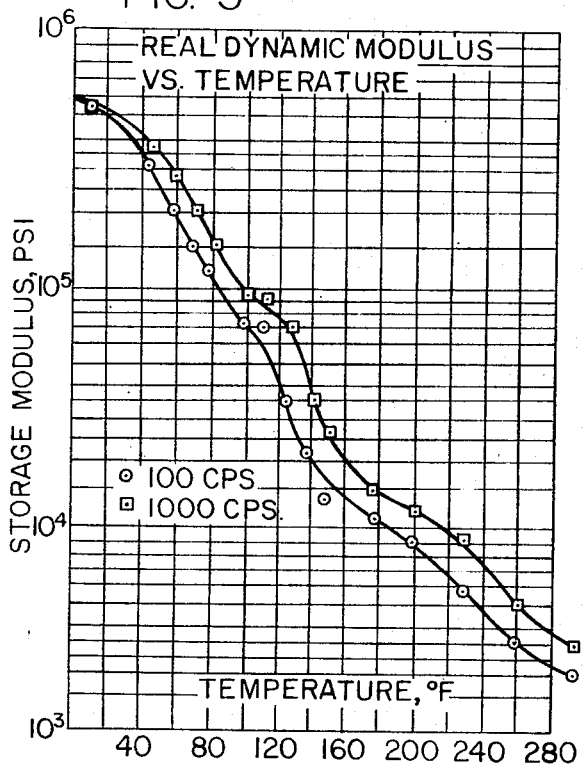
FIG. 3
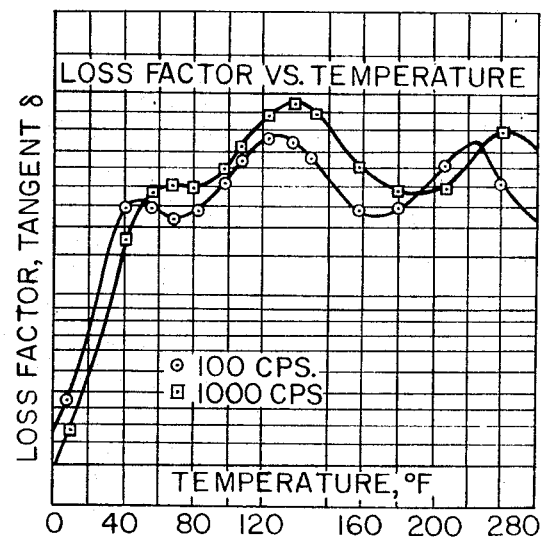
FIG. 2
INVENTOR.
FRANCIS SCOTT OWENS
BY
Harry A. Herbert Jr.
ATTORNEY

United States Patent Office 3,514,427
Patented May 26, 1970

3,514,427
WIDE TEMPERATURE RANGE MULTIPHASE VISCOELASTIC DAMPING COMPOSITIONS
Francis Scott Owens, Dayton, Ohio, assignor to the United States of America as represented by the Secretary of the Air Force
Filed June 26, 1967, Ser. No. 649,436
Int. Cl. C08d 9/08
U.S. Cl. 260—41.5      4 Claims

ABSTRACT OF THE DISCLOSURE

This application discloses the discoveries (1) that polymeric composites, having multiple phase transition temperatures, will have high damping characteristics at each phase transition temperature whether such phase transition temperature is the glass transition temperature (Tg) or the crystallization melt temperature (Tm) or any other suitable phase transition temperature; (2) that block polymers of suitable units and also graft polymers of suitable units have multiple phase transition temperatures; and (3) that blends of suitable components which do not react easily with each other and which are not soluble in each other have multiple phase transition temperatures.

Examples of block polymers, graft polymers and blends having useful viscoelastic qualities and tests showing the temperature sensitivity thereof are given.

Such multiphase polymeric compositions have utility for example on aircraft, on missiles, and on compressor blades in jet engines.

---

The invention described herein may be manufactured and used by or for the United States Government for governmental purposes without payment to me of any royalty thereon.

BACKGROUND OF THE INVENTION

Field of the invention

The inventions disclosed in this application relate to new materials and compositions of matter in the field of viscoelastic materials, and to methods of forming such new compositions of matter. More particularly, the inventions relates to such new compositions of matter which have an extended temperature range over which such compositions exhibit useful structural damping characteristics.

In particular, the inventions relate to polymeric compositions having multiple thermodynamic transition temperatures. Such polymeric compositions may be block polymers or graft polymers formed from suitable components. Such suitable components usually each has thermodynamic transition temperatures differing appreciably from the thermodynamic transition temperatures of the other or others and a polymer formed from the components usually retains the transition temperatures of both or all components, thus resulting in block and/or graft polymers having multiple thermodynamic transition temperatures. For example, certain embodiments of my invention described relate to block polymers, graft polymers, and mixed block and graft polymers.

The inventions also relate to mixtures of components not soluble in each other and not readily reactive with other. For example, certain other embodiments of my invention described relate specifically to mixtures (1) of a polyvinyl acetate with a nitrile-butadiene rubber; (2) of polystyrene with a styrene-butadiene rubber; (3) of polystyrene with a nitrile-butadiene rubber; (4) mixtures of both polystyrene and polyvinyl acetate with a styrene-butadiene rubber; and (5) mixtures of both polystyrene and polyvinyl acetate with a nitrile-butadiene rubber. These components may be and preferably are crosslinked with each other by a curing agent which reacts with the individual components.

Thus, the invention also relates to mixtures of synthetic rubbers and other polymers which do not react with the synthetic rubbers. Thus specifically in these embodiments of the invention, it relates to mixtures of either a nitrile-butadiene copolymer synthetic rubber or a styrene-butadiene copolymer synthetic rubber with a polyvinyl acetate, a polystyrene, or mixtures of polyvinyl acetate with polystyrene. These mixtures show a wider temperature range over which the materials exhibit useful damping characteristics than heretofore believed possible.

The new materials are very effective in eliminating or reducing vibrations in structures where large temperature variations are likely to occur. Not only are they useful in the reduction of vibrations which arise for example in the skin and control structures of aircraft and missiles, but also in the damping of the torsional mode of the compressor blades in jet engines and in other applications.

Description of the prior art

Vibrations in high speed aircraft and missiles arise from turbulent boundary layer conditions, engine thrust, engine noise, unsymmetrical mass distribution of rotary components, etc. Viscoelastic damping materials are now used to isolate, insulate and attenuate unwanted and, at times, harmful oscillations. The viscoelastic damping materials protect delicate instruments from vibrations, personnel from undesirable noise, and structural members of the craft from fatigue failure. Ideally, the materials used as damping materials should eliminate vibrations of all possible frequencies occurring in the craft at all temperatures, from the lowest occurring in the Arctic regions up to the highest possible operating temperature. In addition, the material should be strain insensitive and have a low density. However, this ideal material is becoming more difficult to secure because, as the speed of the crafts increase, the skin and engine temperatures increase, thus widening the temperature requirements for a damping material. In general, elastomers, in the usual sense of the term, cannot act as effectively in damping over such a wide temperature range. The reasons for this are evident when the real part of the complex Young's modulus and the loss factor of an elastomeric high polymer are plotted as functions of temperature as shown in FIG. 1 wherein the curves show a typical real modulus and a typical loss factor plotted vertically against temperature plotted horizontally. The loss factor (eta) $\eta$ is a measure of the damping ability of a material and is related to the complex modulus $E^*$, as follows:

$$E^* = E' + iE'' \qquad (1)$$
$$E^* = E'(1 + i\eta) \qquad (2)$$

where $E'$ is the storage or real modulus, $$i = \sqrt{-1} \text{, and}$$
$$E'' = E'\eta$$

is the loss or imaginary modulus. In such a graph, the initial portion AB which is substantially horizontal is called the "glassy" region and is associated with a high modulus and low mechanical losses. The substantially vertical segment BCD is called the "transition" or "dispersion" region. At temperatures within this range, the materials absorb considerable mechanical energy, converting it into heat energy. The temperature corresponding to C, the inflection point of the curve, is of particular interest. It is called the apparent glass transition temperature and can be denoted, Tg, and is the temperature corresponding to the maximum energy absorption of the material. The width of the dispersion region BCD, the temperature range corresponding to the substantially vertical segment, determines the temperature range over which the material acts most effectively for structural damping applications. For most elastomers this temperature range is approximately 50° F., butyl rubber (polyisoprene-isobutylene) being the exception and having a range of about 100° F. The final horizontal segment DE corresponds to the "rubbery" region an dis usually associated with higher damping than occurs in the glassy region but is considerably lower than that of the transition region. Since all amorphous viscoelastic materials have modulus and damping curves similar to the curves described, and since high damping occurs only within a few degrees or T$g$, the problem of producing wide temperature range viscoelastic damping material is really a problem of producing materials with wider or more numerous dispersion regions. The usual techniques heretofore proposed of varying the kind and level of mineral fillers, plasticizers, curing agents, etc., result only in altering the temperature range at which maximum damping occurs and do not greatly improve either the peak damping of the temperature range of satisfactory damping.

The above and other conclusions reached by the prior art workers is described in the following literature references:

(1) Echer, R., "Secondary Softening Regions of Copolymers, Mixed Polymers, and Graft Polymers," R. Chem. and Tech., vol. XXX No. 1, p. 200–214, (1957).

(2) Ferry, J. D., "Viscoelastic Properties of Polymers," John Wiley & Sons, Inc., (1961).

(3) Yin, T. P. and Pariser, R., "Dynamic Mechanical Properties of Several Elastomers and Their Potentialities in Vibration Control Applications," Journal of Applied Polymer Science, vol. 8, 2427–2443, (1964).

(4) Nielsen, L. E., "Mechanical Properties of Polymers," Reinhold Publishing Corporation, (1962). (See p. 172–173.)

(5) Dunnon, D. C., and de Decker, H. K., "Versatile Materials for Vibration," Rubber Age, (November 1965), p. 89.

(6) Cersa, R. J., "Block and Graft Copolymers," Butterworths, (1962).

(7) Burlant, W. J. and Hoffman, A. S., "Block and Graft Polymers," Reinhold (1960).

(8) Oberst, H., "Akustische Messmethoden in Kunststoff Forschung Pruefung und Entwicklung, Proceeding of the Third International Congress on Acoustics (reprinted and translated in Bruel & Kjaer Bulletin BB3930), (1959).

(9) Van Oort, W. P., "A Method for the Measurement of Dynamic Mechanical Properties of Small Samples of Plastic Material," Microtecnic, vol. VII, No. 5, (1952), p. 246.

(10) Nashif, A. D., "A New Method for Determining the Damping Properties of Viscelastic Materials," presented at the 36th Shock and Vibration Symposium in Los Angeles, California (October 1966).

(11) "Damping Theory," Nuovo Cemento, 38/1, 175–205 (1965 English).

(12) "Damping Characteristics of Elastomers," Rubber age (New York), 97(5) 58–68 (1965 English).

(13) "Testing Materials," American Society of Testing Materials—Special Technical Publication No. 378, 109–24 (1965) English.

(14) "Epoxy resins hardened with long chain polycarboxylic acids." Siemens-Schuckertwerke A.G. Ger. 1,212,193.

SUMMARY OF THE INVENTION

My invention relates to multiphase polymeric viscoelastic compositions which exhibit multiple thermodynamic transition temperatures, and to methods of forming such multiphase compositions wherein each phase retains its own characteristic thermodynamic transition behavior and, wherein, each phase is not soluble in each other phase and the phases (once formed) do not chemically react with each other except where they are caused to react with each other by a chemical initiator such as a curing agent. More specifically it involves viscoelastic polymeric compositions having multiple phase transition temperatures whether obtained by polymer blending or by chemical reactions leading to block and/or graft polymers, where the phase transition temperatures are relatively different from each other so that the multiphase polymeric compositions shall have a widely extended temperature range over which such compositions have useful structural damping characteristics.

Objects

It is a general object of my invention to produce materials or compositions of matter having widely extended temperature ranges over which useful structural damping characteristics are exhibited.

It is a further object of my invention to provide methods of producing materials having such desirable characteristics.

A further object of the invention is to satisfy a need for materials having satisfactory damping characteristics over wide temperature ranges especially useful in meeting requirements throughout industry as well as Air Force requirements.

It is a further general object of my invention to reduce metal fatigue failures resulting from high speed flight conditions and other similar conditions causing such fatigue.

It is a further general object of my invention to reduce high noise levels of high speed flight conditions.

A further object is to provide a technique applicable for producing composites having high damping at specified temperatures or over specified temperature ranges. A rubberlike material having a loss factor of at least 0.1 over a temperature range of about 0° to 200° F. within a frequency range of 100 to 1000 cycles per second with a minimum real dynamic Young's E-modulus of $10^4$ lbs./in.$^2$ was set as one specific objective.

It is a further more specific object of my invention to provide materials or compositions of matter having useful structural damping characteristics at temperatures in the range of from about 0° to 200° F. within a frequency range of 100 to 1000 cycles per second and to provide methods of forming such desired materials.

Other objects and features of the inventions will become apparent from the following specifications disclosing several embodiments of my invention and from the appended claims.

BRIEF DESCRIPTION OF THE DRAWINGS

FIG. 1 is a typical loss factor and real modulus graph; and

FIGS. 2 and 3 are graphs showing respectively the loss factor and real modulus curves of a preferred embodiment of my invention.

GENERAL DESCRIPTION OF THE INVENTION

Either (1) I blend a plurality of suitable polymeric components having varying thermodynamic transition temperatures or (2) I chemically modify existing polymeric materials by reacting them with monomers using well known reaction conditions to produce new polymeric materials having a plurality of transition temperatures, or (3) I chemically modify (crosslink or vulcanize) an existing polymeric material by reacting it with other existing polymeric materials to produce new materials having a plurality of transition temperatures. T$g$ data of the product is one of the most important criteria used in the selection of the polymers and/or monomers to accomplish the objectives. First, the particular polymer system chosen for blending or reaction should be available in a wide variety of transition temperatures and be capable of being chemically modified so as to yield block and/or graft polymers which have multiple transition temperatures; secondly, the polymers or the modified polymers, once they are produced, should not react (or at least not easily react) with one another and should not be appreciably soluble one in the other. The polyesters, polyurethanes, and the polyvinyls meet these requirements in that they are not mutually soluble or mutually reactive one with another. The choice of the particular vinyl polymers to be used was based upon the desire to have a composition which was essentially elastomeric at or below room temperature yet have glass transitions at higher temperatures. Recalling that elastomeric behavior is the result of the polymer being above its glass transition temperature $Tg$, and that this $Tg$ is shifted to higher temperatures by vulcanization as well as by increasing frequencies; one elastomer selected, a styrene-butadiene copolymer containing 23% bound styrene, had a $Tg$ of —65° F. The vinyl polymers selected for blending in the rubber were polyvinyl acetate and polystyrene with $Tg$'s of 84° and 212° F., respectively. Another elastomer used was a very high acrylonitrile containing a nitrile-butadiene copolymer which had a $Tg$ of about 50° F. or more when cured, as measured dynamically.

Again, styrene-butadiene rubber was modified by reacting in the bulk with vinyl acetate and styrene, using procedures known to produce graft polymers. Again styrene-butadiene copolymer latex containing 42% bound styrene was reacted with vinyl acetate using emulsion polymerization techniques. Again this same latex was first reacted with vinyl acetate using emulsion polymerization and when the reaction was complete it was further reacted with styrene.

Blending

Under this heading "Blending," only the preparation of the multiphase polymer blends will be described, as the necessary modifications of this procedure to the multiphase polymer systems (i.e. graft and block polymers) are obvious. The preparation of the blends was done according to the usual procedures followed in rubber compounding. First, the rubber was banded on a two roll 8" water cooled mill. Then zinc oxide was added to neutralize any acid remaining from the coagulation of the polymers and to promote the activity of the curing agent, dicumyl peroxide. The other polymers were added in small amounts as called for in the desired formulation. The polystyrene was added next in the styrene-butadiene copolymer blends. The order of addition was not critical in the nitrile-butadiene blends. Because these polymers were being milled at temperatures below their $Tg$'s, there resulted very high shearing forces and, consequently, a rise in temperature. After the polymers were taken into the rubber, the mixture was refined by passing the composition through a closely set mill. This procedure was repeated several times until the mixture appeared to be homogeneous and then, after cooling, the curing agent was added. Special care to prevent excessive heating had to be exercised while (and after) the curing agent was added. The formulation was again refined several times on a closely set mil, and finally, when the curing agent was uniformly dispersed, it was put back on the mill, sheeted into the desired thickness, and cut into mold preform specimens.

The polymeric materials can be mixed on either a hot or cold rubber mill. A cold mill is preferred when a polystyrene is used and is in a finely divided powdery form, an a hot mill is preferred when the polystyrene is in a coarse crystalline form. The mixing temperature is kept low during and after the addition of zinc oxide, a suitable antioxidant such as for example 2,2'-methylene bis-(4-methyl-6-tertiary-butyl-phenol), and/or dicumyl peroxide.

The curing of the blended materials does not cause the polymers to react with each other, but during the curing process the curing agent reacts with each of the polymers to thus tie the polymers to each other. The peroxides such as dicumyl peroxide, benzoyl peroxide, tertiary butyl peroxide, and dichloro butyl peroxide, are good curing agents. Some are better than others.

On the other hand, the polymers may be caused to react with each other in varying degrees by free radical initiation. This may be accomplished to a limited extent by the peroxides, by ozone, and even mechanically by severe milling. In a similar way, gamma radiation causes reaction of the polymers one with another.

Specimen Prepartion

The preform specimens were compression molded into strips 8" long, 0.450" wide, and in different thicknesses up to 0.125". The molding was done at 280° F. for one hour under a pressure of 500–600 p.s.i. Usually, the hot mold was removed from the press and cooled under a stream of tap water before the specimens were removed. The strips of rubber were bonded on aluminum beams while the rubber was being cured. The same thickness of the viscoelastic material was bonded on both sides of the metal strips. The rubber-to-metal adhesive systems used were commercial products. For practical damping applications, a room temperature curing epoxy adhesive appeared to be better, as it apparently contributed to the mechanical stiffness of the system.

Dynamic Measurements

Tests of the dynamic mechanical properties of the composite beams were made in a temperature controlled test chamber. The room temperature experiments were run first, followed by successively lower temperatures until the temperature was well below the lowest $Tg$ of the particular multiphase system. Next, the higher temperature experiments were run, starting out at room temperature again. A soak period of thirty (30) minutes was given at each experimental temperature, and the measuring device was calibrated just prior to making the test. At each experimental temperature the measurements consisted of obtaining the resonant frequencies and the half-power band width points of each resonant frequency of the composite beam. These measurements are related to the physical and mechanical properties of the materials in the composite beam and were used to calculate the storage modulus and the loss factor of the viscoelastic formulations. For each experimental temperature, the storage modulus and the loss factor were plotted as a function of resonant frequencies. The resulting points are then connected by smooth curves and from these curves the values of the storage modulus and the loss factor at 100 and 1000 cycles per second were interpolated. These values were plotted as a function of temperature, connected with smooth curves, and are the results used herein.

Graft polymers were made by reacting methyl methacrylate, vinyl acetate, and styrene monomers with either hevea rubber, styrene-butadiene copolymer or nitrile- butadiene coplymer. Polymer blends were also made and were found to give essentially the same results. Multiphase systems of polyvinyl acetate, polystyrene, and the styrene-butadiene copolymer were investigated. The composite beams used for the measurements of the styrene-butadiene rubber systems had only one side of the aluminium coated with the viscoelastic material. The results were not completely reliable at first because of the adhesive being used at that time which tended to become ineffective at high temperatures. These results did show, however, that the concept of using multiphase systems of polymers having different $Tg$'s broadens the temperature range of high damping and increases the temperature range where the modulus is high. For example, a blend of equal parts by weight of polystyrene and the styrene-butadiene copolymer had a modulus of greater than $10^4$ p.s.i. over the temperature range of —75° to 225° F. The loss factor caurves had peaks corresponding to the dispersions in the modulus curves.

Nitrile-butadiene copolymers are more resistant to hydrocarbon fuels, oils, solvents, and heat than the styrene-butadiene copolymers. They are more desirable for use as damping material on aircraft where resistances to these media are needed. The higher the acrylonitrile content of the copolymer, the higher the solvent resistance of the copolymer. The reason for the hydrocarbon fluid resistance is the presence of the polar nitrile groups in the polymer molecule. These polar groups contribute to the damping of the rubber by making the polymer more sensitive to frequency variations; i.e., the damping under the same temperature conditions is better at higher rather than at lower frequencies. As the acrylonitrile content of the copolymer increases, the Tg also increases. There is, however, a reduction of low temperature properties. The particular nitrile-butadiene copolymer used was one which had a very high acrylonitrile content and has been successfully applied ts liners for fuel hose and as oil seals. It has a Tg just below room temperature and can be blended with many other rubbers and plastics, particularly the polar compositions. Furthermore, the particular nitrile-butadiene copolymer can be made to react with vinyl monomers using several available techniques. This particular nitrile-butadiene copolymer also is somewhat reinforced by compatible plastic polymers having high Tg's such as polystyrene, for instance. The specimens used for the evaluation of the storage modulus and the loss factor had the copolymer bonded on both sides of the aluminum beams. The latter results are more reliable than those obtained with composite beams which had the copolymer on only one side.

DESCRIPTION OF THE PREFERRED EMBODIMENTS

The use of viscoelastic materials for structural damping on aircraft and missiles has been unduly limited because of the temperature sensitivity of these materials. I have demonstrated two or more techniques both involving the same principle for extending the temperature range over which these compositions have useful damping. The principle referred to is based upon the phenomena that viscoelastic polymers exhibit a high level of damping only within a few degrees of their glass transition temperatures and that certain types of polymer blends exhibit more than one glass transition temperature. The principle specifically is that a polymeric composition absorbs considerable energy whenever it is undergoing a thermodynamic phase transformation. My approach based on this principle is to produce compositions having multiple thermodynamic phase transition temperatures in order to secure wide temperature range vibration damping materials or compositions. The multiphase polymeric systems can be obtained either by blending of polymeric materials or by chemical reactions leading to block and/or graft polymers. Multiphase systems of polyvinyl acetate and polystyrene with a styrene-butadiene or with a nitrile-butadiene rubber were found to be useful over temperature ranges including all the glass transitions of the polymers in the systems. Both (1) the polyvinyl acetate with polystyrene-nitrile rubber systems and (2) the polystyrene-nitrile rubber systems are excellent in having desired properties including a loss factor of 0.1 or more and a modulus of $10^4$ p.s.i. over a 200° F. range. Three polymer systems have a higher level of damping over a wider temperature range than two polymer systems, and the two polymer systems are better than the base elastomers.

I have demonstrated (as illustrated in the following examples) that the temperatures over which viscoelastic materials have useful damping characteristics (in the use of such materials for example for structural damping on aircraft and missiles and in jet engines) may be usefully extended.

Following are examples of the practice of the invention.

EXAMPLE I

I cured a mixture of a nitrile-butadiene rubber, 100 parts; zinc oxide, 10 parts; and dicumyl peroxide, 3 parts; for 1 hour at 280° F.

The storage modulus of the resulting vulcanizate was $4 \times 10^5$ p.s.i. at 0° and dropped to $4 \times 10^3$ p.s.i. at 75° F. This large change in the modulus is associated with a very high loss factor peak. The height and width of the damping peak is considerably higher and wider than that obtained for the styrene-butadiene rubber. The maximum in the loss factor was around 1.0, while it was 0.5 for the styrene-butadiene polymer. The temperature range over which the losses were above 0.1 and over which the modulus was above $10^4$ p.s.i. was from about 20° to about 60° F.

EXAMPLE II

I cured a mixture of nitrile-butadiene rubber, 100 parts; polyvinyl acetate, 100 parts; zinc oxide, 10 parts; dicumyl peroxide, 3 parts; for 1 hour at 280° F. The formulation had two dispersion regions which overlapped so much that they did not appear separate on modulus curves. The modulus of this blend was greater than $10^4$ p.s.i. at temperatures below 115° F. A $10^2$ decrease in the modulus took place over a temperature range of 0°–175° F. The closeness of the Tg's of the two polymers is the reason why there is not more of a break in the modulus curves and led to the damping peaks being close together. Also, the nearness of the Tg's helped to keep the damping curves at a high level over a wider temperature range. The loss factor curve is above 0.1 over the range of 25°–175° F., and is above 0.3 over the range of 40°–175° F. Peak damping of about 1.0 occurred at about 50° and 125° F. with the highest peak at 125° F. being attributed to the presence of polyvinyl acetate. The damping peak due to the rubber was lowered as a consequence of the dominating effect of the second polymer. The one component nitrile-butadiene rubber of Example I had the desired properties over the temperature range 20–60° F., while the two component blends met the objectives over the 20–115° F. range. Thus, the addition of polyvinyl acetate to the rubber increased the temperature range by 55° F.

EXAMPLE III

I cured a mixture of nitrile-butadiene rubber, 100 parts; polystyrene, 100 parts; zinc oxide, 10 parts; and dicumyl peroxide, 3 parts; for 1 hour at 280° F. This formulation had dynamic behavior similar to the polyvinyl acetate blends; however, the modulus curves have very definite transitions and there are breaks in the curves at about 150° F. This was a result of the polymers in the blend having widely separated Tg's. Apparently, the polystyrene contributes to the dynamic strength of the rubber and helps to keep the modulus high, particularly at the elevated temperatures. The modulus remained above $10^4$ p.s.i. up to 225° F. The loss factor curves have peaks of 0.6 at 50° F. and 0.8 at 250° F. The losses are above 0.1 over 25–275° F. temperature range. Therefore this two component blend showed the desired properties over the range of 25–225° F. and functioned very well as a vibration damping material within this temperature range.

EXAMPLE IV

I cured a mixture of nitrile-butadiene rubber, 100 parts; polystyrene, 100 parts; polyvinyl acetate, 100 parts; zinc oxide, 10 parts; dicumyl peroxide, 3 parts; for one hour at 280° F. This formulation had three transitions which are more evident from the damping curves than from the modulus curves. For this three polymer blend, the modulus remained above $10^4$ p.s.i. up to 200° F. The loss factor vs. temperature curves had peaks of 0.3 at 65° F., 0.9 at 130° F., and 0.4 at 230° F. for 1000 cps.; and of 0.15 at 40° F., 0.5 at 120° F., and 0.6 at 230° F. for 100 cps. Here the frequency dependency of the loss factor is very noticeable. While both the two and three polymer blends were good, over a temperature of 65° to 230° F., the three component blends have better damping than the two component mixtures because the area under the loss factor curves are larger, which area is a measure of the energy absorbed.

EXAMPLE V

I blended and cured for 1 hour at 280° F. polystyrene with a Tg of 212° F. with a styrene-butadiene copolymer containing 23% bound styrene and having a Tg of −65° F. (with zinc oxide and dicumyl peroxide). The dynamic tests likewise indicated that though this mixture gave an improvement in the temperature range of useful damping characteristics, yet a higher Tg elastomer would be more desirable. This blend had a modulus of greater than $10^4$ p.s.i. over the temperature range of minus 70° to 25° F. and a modulus of greater than $10^3$ up to 200° F. The loss factor curves have two peaks.

EXAMPLE VI

A graft polymer was prepared by reacting 50 mls. of styrene-butadiene copolymer (latex) having 46% bound styrene and 49% solids with 25 mls. of vinyl acetate and about 125 mls. of water and with 0.3 gram potassium persulfate at 130°–150° F. for about 16 hours. The reaction products were coagulated, dried and used without further purification. 100 parts of the reaction products, 10 parts of zinc oxide, and 3 parts dicumyl peroxide were blended together and cured for 1 hour at 280° F. The modulus of the product is above $10^4$ p.s.i. from −75° up to 95° F. The damping curve has only one peak which is higher (and the temperature range over which loss factor is above 0.1 is greater) then when only the base elastomer is used. The damping and modulus curves are substantially identical with curves resulting from blends of identical styrene-butadiene rubber with vinyl acetate in the same proportions.

EXAMPLE VII

I used a graft polymer prepared by reacting 100 mls. of styrene-butadiene copolymer (latex) containing 46% bound styrene and 49% solids with 50 mls. vinyl acetate, 0.6 gm. potassium persulfate, 0.6 gm. sodium lauryl sulfonate and 50 mls. of water for 16 hours at about 145° F. Then 0.6 gm. potassium persulfate, 50 mls. water, and 50 mls. of styrene were added. The reaction was run for 48 hours at 149° F. The reaction products were dried and used without purification. 100 parts of the reaction products, 10 parts zinc oxide, and 3 parts dicumyl peroxide were blended together and cured for 1 hour at 280° F. The damping and modulus curves are essentially the same as when the same proportion of the various ingredients are used as in Example VI to form a blend.

EXAMPLE VIII

I used a graft polymer prepared by adding 100 mls. of styrene monomer to butadiene-acrylonitrile copolymer (latex) (BD/AN (67/33)) and polymerizing in the presence of a peroxide catalyst. I blended 100 parts of this graft polymer with 50 parts FEF black, 1 part stearic acid, 5 parts zinc oxide, 10 parts dioctylphthalate, 1 part of an N-alkyl-N'-aryl-p-phenylenediamine, 1.5 parts sulfur, and 1.5 parts benzothiazyl disulfide and cured for ½ hour at 310° F. The modulus was above $10^4$ p.s.i. up to 150° F. and the modulus curve had two dispersion regions. The damping curve had two peaks. The highest peak was about 0.7 at 50° F. and the other peak was about 0.3 at 220° F. The damping curve was above 0.2 from about 10°–300° F.

EXAMPLE IX

I again used a graft polymer prepared by adding 100 mls. of styrene monomer to butadiene-acrylonitrile copolymer (BD/AN (67/33)) and polymerizing in the presence of a peroxide catalyst. I blended 100 parts of this graft polymer with the same amount of the ingredients listed in Example VI and cured the same. The modulus of this multiphase system was above $10^4$ p.s.i. up to 300° F. The damping curve was about 0.1 from 0°–250° F. A polymer blend of the same proportions had modulus and damping curves which could be superimposed on the curve of the above and were practically identical.

EXAMPLE X

I blended 100 parts isobutylene-isoprene copolymer, 100 parts acrylonitrile-butadiene copolymer, 100 parts polyvinyl acetate, 100 parts polystyrene, 10 parts zinc oxide, and 10 parts SP-1055 resin and cured for 1 hour at 310° F. The dispersion regions of the modulus curves are not distinguishable. The modulus is above $10^3$ p.s.i. up to above 200° F.; it is above $10^4$ p.s.i. up to about 125° F. There are three very pronounced peaks in the damping curves and one pseudopeak corresponding to the polystyrene. The loss factor is essentially above 0.1 over minus 75° to +190° F.

EXAMPLE XI

I separately blended 0 part, 10 parts, 20 parts, 30 parts, 40 parts, 50 parts, 60 parts, 70 parts, 80 parts, 90 parts, or 100 parts polyvinyl acetate with 100 parts acrylonitrile-butadiene copolymer, 100 parts polystyrene, 10 parts zinc oxide, and 3 parts dicumyl peroxide and cured for 1 hour at 280° F. All these formulations are good vibration damping materials with loss factors greater than 0.1 over a temperature of about 25–300° F. The modulus is greater than $10^3$ p.s.i. over this temperature range. By altering the proportions of polyvinyl acetate, I found it is possible to get all three of the damping peaks at about the same height. 40, 50, or 60 parts polyvinyl acetate are the levels needed to have all peaks near the same height. The multiphase system containing 50 parts polyvinyl acetate had damping peaks of 0.7, 0.7, and 0.4 occurring at 60, 150, and 235° F., respectively. The modulus was above $10^4$ p.s.i. up to 200° F. and was above $10^3$ p.s.i. up to 300° F. I found that the high temperature modulus can be increased by adding reinforcing fillers such as SAF black and/or more curing agent, and it can be decreased by decreasing the proportions of the polystyrene, curing agent, or by other means. An increase in the modulus appears to us to be more desirable.

EXAMPLE XII

I separately blended 0 part, 10 parts, 20 parts, 30 parts, 40 parts, 50 parts, and 60 parts SAF black with 100 parts acrylonitrile-butadiene copolymer, 50 parts polyvinyl acetate, 100 parts polystyrene, 10 parts zinc oxide, 3 parts dicumyl peroxide, and 1 part antioxidant, and cured for 1 hour at 280° F. I found that the vibration damping curves of all these multiphase formulations can, within experimental error, be superimposed and are substantially identical except for the 60 parts SAF black formulation which shows a lower damping curve than the others. The high temperature modulus was increased in proportion to the amount of SAF black used in the formulation. The final decision on the amount of SAF black to use in the damping formulation depends upon the desired tensile strength of the cured multiphase polymer system. I prefer the 50 parts SAF black level because it shows a higher tensile strength.

EXAMPLE XIII

I separately blended 3 parts, 5 parts, and 7 parts dicumyl peroxide with 100 parts acrylonitrile-butadiene copolymer, 50 parts polyvinyl acetate, 100 parts polystyrene, 10 parts zinc oxide, 50 parts SAF black, and 1 part antioxidant, and cured for 1 hour at 280° F. The damping and modulus curves of these three formulations are very close to being identical. The tensile strength, on the other hand, increases with successive increases in the amount of curing agent used. 7 parts of curing agent is most desirable where a higher tensile strength material is needed. A graph showing Loss Factor vs. Temperature for one of these formulations is provided in FIG. 2. A graph showing Real Dynamic Modulus vs. Temperature for the formulation is provided in FIG. 3. Note well that in each of FIGS. 2 and 3, the graphs are plotted on semilogarithmic paper;

that is, the vertical scale is logarithmic while the horizontal scale is a linear or uniform scale.

EXAMPLE XIV

I mixed 0.2 mole hydroxy terminated poly(ethylene sebacate) (molecular weight 6500) and 0.8 mole hydroxy terminated poly(propylene adipate) (molecular weight 8000) with 0.01 mole 1,6-hexamethylene diisocyanate under an atmosphere of dry nitrogen for 1½ hours at 260° F. with intermittent stirring. The resulting block polymer is isocyanate terminated and the polyester units are connected through a urethane linkage. The two $T_g$'s of this block polymer were found to be −18° and −40° F., corresponding to the poly(propylene adipate) and the poly(ethylene sebacate) units respectively. The poly(ethylene sebacate) melts ($T_m$) at 172° F.

I mixed 10 parts zinc oxide and 5 parts hydrated silica with 100 parts of the block polymer. The mixture is formed and bonded on an aluminum beam in a press at 280° F. for 20 minutes starting with a cold mold. The formed specimen was cooled in the press under pressure using cooling water. The level of cure was very low, yet the loss factor was above 0.1 and the modulus was above $10^4$ p.s.i. over the temperature range −44° to 55° F. Peak damping of 1.0 occurred at about −20° F. At 80° F. the poly(ethylene sebacate) units started melting under the dynamic excitation. This melting caused an increase in the loss factor. The modulus and loss factor were above $10^4$ p.s.i. and 0.1, respectively, at 100° F. where the measurements were terminated. The damping is greater than can be accounted for in a material having only one phase transition temperature. These results clearly show increased damping over the temperature range of each block segment in the polymer.

EXAMPLE XV

A block polymer consisting of 0.6 mole fraction (propylene adipate) and 0.4 mole fraction poly(ethylene sebacate) was prepared as described above. 0.40 mls. of 1,4-butanediol was milled into 13.9 gms. of the block polymer. This mixture was cured for 1 hr. at 250° F. and cooled in the press. The loss factor of this cured block polymer was above 0.1 over −43° to 55° F. The peak value was 0.4 at −20° F. The modulus was above $10^4$ p.s.i. up to 87° F. The 100 cps. modulus curve had two inflection points indicating the two separate $T_g$'s of the polymer. This block polymer demonstrated good damping over the temperature range −43° to 53° F. which includes the $T_g$'s for each block segment.

SUMMARY OF EXAMPLES

Multiphase polymeric systems can be used to broaden the temperature range of adequate viscoelastic damping. The three component multiphase system compositions are better damping compositions than the two component multiphase compositions because the area under the loss factor curves are larger and the two component multiphase system compositions are better than the single phase composition for the same reason. The loss factor was 0.1 or more and the real modulus was $10^4$ p.s.i. or more over 20–60° F. for a vulcanizate of nitrile rubber; 20–115° F. for the vulcanizate of the polyvinyl-acetate-nitrile rubber system; and 25–225° F. for both the vulcanizate of the polystyrene-nitrile rubber system and the vulcanizate of the polyvinyl acetate-polystyrene-nitrile rubber system.

The addition of SAF black and more of the curing agent improves the high temperature modulus of the three phase material without reducing the damping. Example XIII listed above has a loss factor of 0.1 or more over 25–300° F. and the modulus is greater than $10^3$ p.s.i. over this temperature range; it is above $10^4$ p.s.i. up to about 235° F. Adding 25 parts of a medium acrylonitrile containing nitrile-butadiene rubber results in the loss factor being 0.1 or more over 0–300° F. and the modulus is greater than $10^3$ p.s.i. over this temperature range.

The above results show that the temperature sensitivity of viscoelastic materials can be used to an advantage to obtain a high level of damping along with a high modulus over a wide temperature range. These results also demonstrate the almost unlimited flexibility of results in damping applications possible by thoughful manipulation of multiphase systems of polymeric compositions. It seems apparent therefore that the ideas used to achieve the objective can be applied to other temperature ranges where a high level of damping has been difficult to obtain.

It is to be understood that while specific examples described preferred embodiments of my invention, they are for the purpose of illustration only, that the products and methods of the invention are not limited to the precise details and conditions disclosed and that various changes may be made therein without departing from the spirit of the invention which is defined by the following claims.

I claim:
1. A viscoelastic composition of matter having useful structural damping characteristics over a wide temperature range comprising a blended and cross-linked mixture of equal parts by weight of acrylonitrile-butadiene copolymer, polyvinyl acetate, and polystyrene.

2. A viscoelastic composition of matter according to claim 1 wherein an equal part by weight of isobutylene-isoprene copolymer is blended with and cross-linked with the equal parts by weight of acrylonitrile-butadiene copolymer, polyvinyl acetate, and polystyrene.

3. A viscoelastic composition of matter comprising 100 parts by weight of very high acrylonitrile content acrylonitrile-butadiene copolymer, 100 parts by weight of polystyrene, 50 parts by weight of polyvinyl acetate, and 0 to 60 parts by weight of SAF black, said parts blended and cross-linked together.

4. A viscoelastic composition of matter according to claim 3 wherein 25 parts of medium acrylonitrile containing acrylonitrile-butadiene copolymer is blended and cross-linked with said very high acrylonitrile-butadiene copolymer, polystyrene, polyvinyl acetate, and SAF black.

References Cited

UNITED STATES PATENTS

| | | | |
|---|---|---|---|
| 2,412,216 | 12/1946 | Harvey | 260—887 |
| 2,471,870 | 5/1949 | Gidley | 260—887 |
| 2,614,093 | 10/1952 | Wheelock | 260—892 |
| 3,021,300 | 2/1962 | Ardley et al. | 260—892 |
| 3,068,191 | 12/1962 | Seijo et al. | 260—893 |
| 3,092,250 | 6/1963 | Knutson et al. | 260—887 |

FOREIGN PATENTS 964,229   7/1964   Great Britain.

SAMUEL H. BLECH, Primary Examiner

M. J. TULLY, Assistant Examiner

U.S. Cl. X.R.

260—4, 40, 75, 858, 860, 879, 880, 887, 888, 892, 893